United States Patent Office 3,362,162
Patented Jan. 9, 1968

3,362,162
AUTOMATIC POWER TRANSMISSIONS
FOR MOTOR VEHICLES
Peter F. Willmer, Knowle, Solihull, England, assignor to
The Rover Company, Limited, Solihull, England, a
British company
Filed June 30, 1966, Ser. No. 561,837
Claims priority, application Great Britain,
July 2, 1965, 28,042/65
2 Claims. (Cl. 60—54)

This invention relates to power transmissions for motor vehicles, of the kind employing a torque converter or hydraulic coupling usually in conjunction with one or more stages of epicyclic or other gearing. The impeller and turbine of the torque converter or coupling are usually enclosed in an oil tight rotating casing which is in turn enclosed in a stationary bell-shaped housing between the engine and the stationary casing enclosing the gears. In some constructions this bell housing is combined with the gearbox casing. Generally such transmissions are automatically controlled in accordance with road speed and engine torque.

The circulation of the hydraulic fluid in the coupling or converter together with various losses in the associated gearbox mechanisms inevitably generate some heat, and its dissipation is known to cause a problem. In some cases it is dissipated to the atmosphere directly from the gearbox housing and in some cases also from the outer surface of the rotating casing of the torque converter or coupling which may be provided with blades to provide air circulation between it and the stationary bell housing. Where the problem is more serious the hydraulic fluid is fed to a separate oil cooling heat exchanger.

According to the invention cooling of transmission fluid is achieved by making the bell housing of double-walled construction and passing the transmission fluid between the two walls. In this way a substantial additional area, which may be substantially the whole of the surface area of the bell housing, is available for dissipating heat from the oil to atmosphere, and the outside of the housing may, in a known manner, be provided with fins.

However, in addition to the dissipation of heat to the atmosphere outside the housing there is also dissipation inwards to air flowing inside the housing between the housing and the rotating casing of the torque converter or hydraulic coupling themselves. The rotating casing may be provided in a known manner with external turbine blades to assist in promoting a flow of cooling air through the housing, which is provided with appropriate inlet and outlet openings.

The double-walled construction need not extend over the whole area of the bell housing. Moreover, instead of comprising separately identifiable inner and outer walls or skins, it could simply be of single-thickness construction with an array or grid of oil galleries within its thickness to carry the fluid.

The invention will now be described by way of example with reference to the accompanying drawings, in which.

Figure 1:
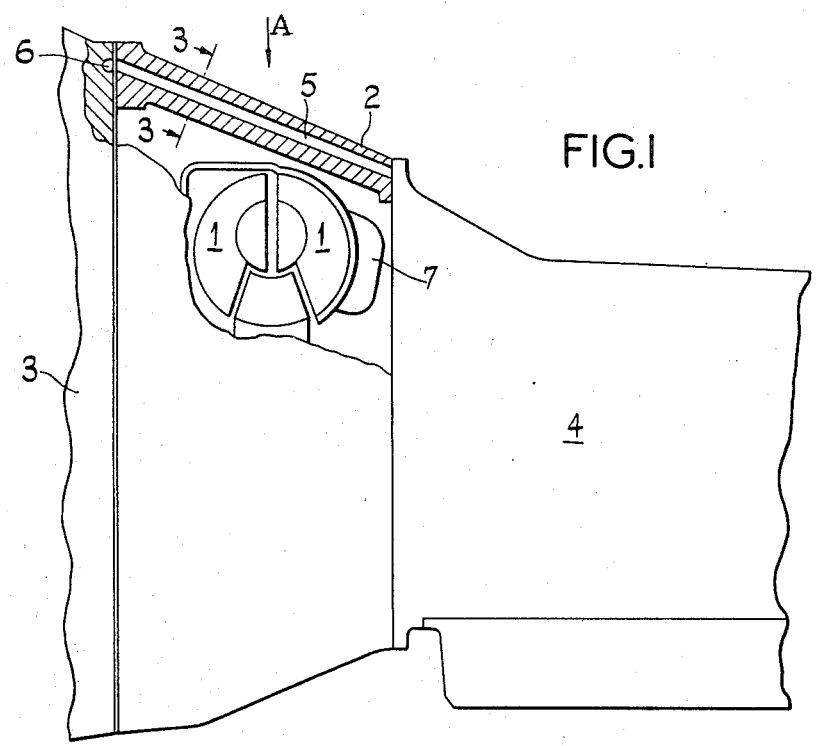
FIGURE 1 is a diagrammatic sectional elevation of the bell housing of the torque converter for an automatic transmission, showing also part of the casing of the gearbox of transmission and indicating the torque converter itself.
Figure 2:
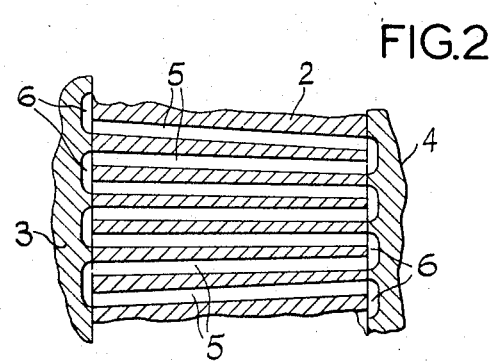
FIGURE 2 is a developed scrap section of the wall of the bell housing, looking in the direction of the arrow A in FIGURE 1.

The bell housing of a torque converter 1 of an automatic vehicle transmission is shown at 2, its forward and larger end being bolted to the flywheel housing 3 forms the rear end of the crankcase of an internal combustion engine and its rear end being bolted to a gearbox housing 4. Longitudinal passages 5 are formed in the wall thickness of the casting that forms the bell housing and in the example shown these passages open into the front and rear faces of the housing. Circumferentially extending grooves 6 are provided in the mating faces of the engine crankcase block and in the gearbox housing 4 and are positioned so that, when the housings are assembled together these grooves link adjacent pairs of passages, the grooves of the gearbox face being staggered with respect to those of the crankcase face so that a long continuous sinuous passage is formed. Connections to it can be made through pipes opening into the mating face at the front end of the gearbox housing 4; the transmission oil that is used in the gearbox to operate the clutch and or brakes and which may in some cases be used to empty and fill the converter 1 during gear-changes is circulated through this passage to dissipate the heat in the oil. The heat is not only dissipated outwards directly to the air in contact with the outside of the bell housing but can also be dissipated inwards. Circulation of cool air through the inside of the housing can be promoted by fan blades 7 on the impeller of the torque converter in a known manner. There may also be fins (not shown) extending preferably circumferentially on the inside and/or outside surface of the bell housing 2.

Figure 3:
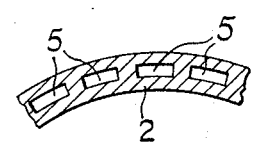
FIGURE 3 is a section on the line 3—3 in FIGURE 1.

A typical shape for the passage 5 is shown in FIGURE 3. They are of roughly rectangular shape, three times as wide as they are thick and spaced apart by a distance equal to about twice their thickness. They may be provided virtually all over the wall of the bell housing or only over part of it, according to the amount of heat dissipation required.

I claim:

1. In a motive power transmission assembly comprising a hydraulic coupling, a housing having a wall enclosing said coupling, a hydraulically controlled gearbox mechanically connected to said coupling, and a source of hydraulic fluid for controlling said gearbox, the improvement that consists in the provision of passages in said housing, and means for guiding said hydraulic fluid through said passages for cooling purposes.

2. In a motive power transmission as set forth in claim 1, a second housing, and third housing enclosing said gearbox, said first-mentioned housing being sandwiched between said second and third housings, and said passages extending right through said first housing wall between said second and third housings, said passages being interconnected by grooves formed in co-operating faces of said second and third housings.

References Cited

UNITED STATES PATENTS

| 1,327,080 | 1/1920 | Brown | 60—54 |
| 1,688,968 | 10/1928 | Huwiler | 60—54 |
| 2,672,953 | 3/1954 | Cline. | |

EDGAR W. GEOGHEGAN, *Primary Examiner.*